（12） United States Patent
Block et al.

(10) Patent No.: US 8,014,731 B2
(45) Date of Patent: Sep. 6, 2011

(54) ELECTRIC CIRCUIT MODULE, CIRCUIT MODULE ARRANGEMENT AND USE OF SAID CIRCUIT MODULE AND OF SAID CIRCUIT MODULE ARRANGEMENT

(75) Inventors: Christian Block, Stainz (AT); Holger Fluehr, Graz (AT)

(73) Assignee: EPCOS AG, Munich (DE)

( * ) Notice: Subject to any disclaimer, the term of this patent is extended or adjusted under 35 U.S.C. 154(b) by 368 days.

(21) Appl. No.: 10/466,338

(22) PCT Filed: Jan. 17, 2002

(86) PCT No.: PCT/DE02/00129
§ 371 (c)(1),
(2), (4) Date: Feb. 12, 2004

(87) PCT Pub. No.: WO02/058239
PCT Pub. Date: Jul. 25, 2002

(65) Prior Publication Data
US 2004/0130388 A1 Jul. 8, 2004

(30) Foreign Application Priority Data

Jan. 18, 2001 (DE) .................................. 101 02 201

(51) Int. Cl.
*H04B 1/44* (2006.01)
(52) U.S. Cl. ......... 455/78; 455/83; 455/552.1; 455/130; 455/188.1; 455/217; 455/437; 455/296; 455/82; 333/133; 333/104; 333/134; 333/136; 333/193; 333/103; 333/101; 361/119; 361/306.3; 361/112; 327/73; 327/415

(58) Field of Classification Search .................... 455/78, 455/83, 552.1, 130, 188.1, 217, 437, 296, 455/82; 333/133, 104, 134, 136, 174, 193; 343/700; 361/119, 306.3, 112; 327/73, 415
See application file for complete search history.

(56) References Cited

U.S. PATENT DOCUMENTS

| 3,587,017 A | 6/1971 | Kurusu |
| 3,728,731 A | 4/1973 | Choi et al. |
| 3,934,175 A | 1/1976 | Clark |

(Continued)

FOREIGN PATENT DOCUMENTS
DE     31 35 515       6/1982
(Continued)

OTHER PUBLICATIONS

Data Sheet for TVSF0603 "FemtoFarad", Polymer ESD Suppressor, Mircosemi, Transient Protection Products Group, [www.microsemi.com/tvs] [(c) 2000].

(Continued)

*Primary Examiner* — Temesgh Ghebretinsae
*Assistant Examiner* — April G Gonzales
(74) *Attorney, Agent, or Firm* — Fish & Richardson P.C.

(57) ABSTRACT

Circuitry includes a voltage-controlled switch having a transmitter input, a receiver input, and an output that connects to one of the transmitter input and the receiver input. Passive components form a low-pass filter that is electrically connected to the transmitter input. The passive components are part of a multilayer ceramic passive module that includes a base body made of superimposed dielectric layers and electrically conductive layers. The voltage-controlled switch is on an upper portion or a lower portion of the base body.

19 Claims, 2 Drawing Sheets

U.S. PATENT DOCUMENTS

| | | | |
|---|---|---|---|
| 3,968,411 A | 7/1976 | Mueller | |
| 4,007,355 A * | 2/1977 | Moreno | 235/379 |
| 4,303,911 A * | 12/1981 | Hulick | 340/825.69 |
| 4,399,557 A | 8/1983 | Muszkiewicz | |
| 4,410,902 A | 10/1983 | Malik | |
| 4,525,863 A | 6/1985 | Stites | |
| 4,573,168 A | 2/1986 | Henze et al. | |
| 4,695,283 A | 9/1987 | Aldinger | |
| 4,709,233 A | 11/1987 | Duval | |
| 4,739,436 A | 4/1988 | Stefani et al. | |
| 4,758,805 A | 7/1988 | Yamazaki et al. | |
| 4,759,051 A * | 7/1988 | Han | 455/437 |
| 4,783,846 A | 11/1988 | Wachob | |
| 4,977,357 A | 12/1990 | Shrier | |
| 4,999,595 A | 3/1991 | Azumi et al. | |
| 5,053,910 A | 10/1991 | Goldstein | |
| 5,122,878 A | 6/1992 | Heigl et al. | |
| 5,122,921 A | 6/1992 | Koss | |
| 5,148,345 A | 9/1992 | Allina | |
| 5,179,731 A | 1/1993 | Trankle et al. | |
| 5,203,019 A | 4/1993 | Rinderle | |
| 5,276,422 A | 1/1994 | Ikeda et al. | |
| 5,321,573 A | 6/1994 | Person et al. | |
| 5,323,332 A | 6/1994 | Smith et al. | |
| 5,473,293 A * | 12/1995 | Chigodo et al. | 333/104 |
| 5,488,540 A | 1/1996 | Hatta | |
| 5,521,561 A | 5/1996 | Yrjola et al. | |
| 5,523,716 A | 6/1996 | Grebliunas et al. | |
| 5,532,897 A | 7/1996 | Carpenter | |
| 5,576,920 A | 11/1996 | Kosuga et al. | |
| 5,583,734 A | 12/1996 | McMills et al. | |
| 5,625,894 A | 4/1997 | Jou | |
| 5,628,850 A * | 5/1997 | Sanchez et al. | 156/89.12 |
| 5,630,223 A * | 5/1997 | Bahu et al. | 455/296 |
| 5,675,468 A | 10/1997 | Chang | |
| 5,689,818 A | 11/1997 | Caglio et al. | |
| 5,714,900 A | 2/1998 | Ehlers | |
| 5,742,896 A | 4/1998 | Bose et al. | |
| 5,768,690 A | 6/1998 | Yamada et al. | |
| 5,783,976 A * | 7/1998 | Furutani et al. | 333/134 |
| 5,815,804 A * | 9/1998 | Newell et al. | 455/78 |
| 5,889,308 A | 3/1999 | Hong et al. | |
| 5,896,265 A | 4/1999 | Glaser et al. | |
| 5,903,421 A | 5/1999 | Furutani et al. | |
| 5,914,481 A | 6/1999 | Danielson et al. | |
| 5,926,075 A | 7/1999 | Hayashi | |
| 5,982,253 A | 11/1999 | Perrin et al. | |
| 5,995,387 A | 11/1999 | Takahashi et al. | |
| 6,060,960 A | 5/2000 | Tanaka et al. | |
| 6,072,993 A | 6/2000 | Trikha et al. | |
| 6,100,606 A | 8/2000 | Nakahata et al. | |
| 6,100,776 A * | 8/2000 | Furutani et al. | 333/136 |
| 6,111,478 A * | 8/2000 | Furutani et al. | 333/174 |
| 6,114,848 A | 9/2000 | Suto et al. | |
| 6,236,551 B1 | 5/2001 | Jones et al. | |
| 6,243,247 B1 | 6/2001 | Akdag et al. | |
| 6,272,327 B1 | 8/2001 | Kurchuk et al. | |
| 6,289,204 B1 * | 9/2001 | Estes et al. | 455/78 |
| 6,320,547 B1 * | 11/2001 | Fathy et al. | 343/700 MS |
| 6,335,641 B1 * | 1/2002 | Tougou | 327/73 |
| 6,337,722 B1 | 1/2002 | Ha et al. | |
| 6,385,030 B1 | 5/2002 | Beene | |
| 6,407,614 B1 * | 6/2002 | Takahashi | 327/415 |
| 6,445,262 B1 * | 9/2002 | Tanaka et al. | 333/133 |
| 6,456,172 B1 * | 9/2002 | Ishizaki et al. | 333/133 |
| 6,512,427 B2 | 1/2003 | Nakano | |
| 6,525,346 B2 | 2/2003 | Mizutani | |
| 6,570,469 B2 * | 5/2003 | Yamada et al. | 333/193 |
| 6,590,263 B2 | 7/2003 | Gossner | |
| 6,608,547 B1 | 8/2003 | Greier et al. | |
| 6,633,748 B1 * | 10/2003 | Watanabe et al. | 455/78 |
| 6,657,827 B1 | 12/2003 | Fukuda et al. | |
| 6,731,184 B1 * | 5/2004 | Muto et al. | 333/103 |
| 6,738,609 B1 | 5/2004 | Clifford | |
| 6,745,046 B1 | 6/2004 | Eckert et al. | |
| 6,759,925 B2 | 7/2004 | Satoh et al. | |
| 6,768,898 B2 * | 7/2004 | Furutani et al. | 455/82 |
| 6,795,714 B1 | 9/2004 | Fickenscher et al. | |
| 6,822,295 B2 | 11/2004 | Larson | |
| 6,831,528 B2 * | 12/2004 | Nagata et al. | 333/101 |
| 6,847,803 B1 | 1/2005 | Rauhala et al. | |
| 6,856,213 B2 * | 2/2005 | Tsurunari et al. | 333/133 |
| 6,987,984 B1 * | 1/2006 | Kemmochi et al. | 455/552.1 |
| 7,027,777 B2 * | 4/2006 | Uriu et al. | 455/78 |
| 7,027,779 B2 * | 4/2006 | Tai et al. | 455/83 |
| 7,057,472 B2 * | 6/2006 | Fukamachi et al. | 333/101 |
| 7,221,922 B2 * | 5/2007 | Kemmochi et al. | 455/277.1 |
| 7,343,137 B2 * | 3/2008 | Block et al. | 455/78 |
| 7,412,210 B2 * | 8/2008 | Okuyama | 455/78 |
| 7,471,930 B2 * | 12/2008 | Okuyama et al. | 455/78 |
| 7,492,565 B2 * | 2/2009 | Block et al. | 361/119 |
| 2001/0004767 A1 | 6/2001 | Gordon et al. | |
| 2001/0027091 A1 | 10/2001 | Kimishima | |
| 2002/0080537 A1 | 6/2002 | Landy | |
| 2002/0090974 A1 * | 7/2002 | Hagn | 455/552 |
| 2002/0121668 A1 | 9/2002 | Gossner | |
| 2003/0104780 A1 | 6/2003 | Young | |
| 2003/0181174 A1 * | 9/2003 | Takagi | 455/130 |
| 2004/0032706 A1 * | 2/2004 | Kemmochi et al. | 361/306.3 |
| 2004/0145849 A1 | 7/2004 | Chang et al. | |
| 2004/0246168 A1 * | 12/2004 | Isaji | 342/70 |
| 2004/0257740 A1 * | 12/2004 | Block et al. | 361/112 |
| 2004/0264095 A1 * | 12/2004 | Block et al. | 361/119 |
| 2004/0266378 A1 * | 12/2004 | Fukamachi et al. | 455/188.1 |
| 2005/0059358 A1 * | 3/2005 | Block et al. | 455/78 |
| 2005/0059371 A1 * | 3/2005 | Block et al. | 455/217 |

FOREIGN PATENT DOCUMENTS

| | | |
|---|---|---|
| DE | 32 13 437 | 10/1983 |
| DE | 3626800 | 1/1990 |
| DE | 43 44 333 A1 | 7/1994 |
| DE | 689 25 166 | 6/1996 |
| DE | 29604820 | 7/1996 |
| DE | 196 08 219 | 9/1996 |
| DE | 69515979 | 10/2000 |
| DE | 199 19 368 A1 | 11/2000 |
| DE | 199 31 056 | 1/2001 |
| DE | 199 44 489 | 4/2001 |
| DE | 19649176 | 12/2001 |
| DE | 10201434 | 3/2004 |
| EP | 176440 | 4/1986 |
| EP | 0 681 365 | 11/1995 |
| EP | 0355973 | 12/1995 |
| EP | 0704925 A1 * | 3/1996 |
| EP | 0 704 925 | 4/1996 |
| EP | 0 784 384 | 7/1997 |
| EP | 0785590 | 7/1997 |
| EP | 0 820 155 | 1/1998 |
| EP | 1 037 308 | 9/2000 |
| EP | 1 073 208 | 1/2001 |
| EP | 1073208 A2 * | 1/2001 |
| EP | 1 094 538 | 4/2001 |
| EP | 1189325 | 3/2002 |
| EP | 1 233 528 | 8/2002 |
| EP | 0 837 516 | 1/2004 |
| GB | 877040 | 9/1961 |
| GB | 2089173 | 6/1982 |
| GB | 2299892 | 10/1996 |
| JP | 48-9039 | 2/1973 |
| JP | 50-7788 | 3/1975 |
| JP | 52-9842 | 1/1977 |
| JP | 53-091439 | 7/1978 |
| JP | 62-098905 | 5/1987 |
| JP | 64-090601 | 4/1989 |
| JP | 02-162744 | 6/1990 |
| JP | 03-036924 | 2/1991 |
| JP | 05-299209 | 11/1993 |
| JP | 06-014454 | 1/1994 |
| JP | 06-077707 | 3/1994 |
| JP | 06-112850 | 4/1994 |
| JP | 06112850 | 4/1994 |
| JP | 07-036548 | 7/1995 |
| JP | 09-200077 | 7/1997 |
| JP | 09-284168 | 10/1997 |
| JP | 10-32521 | 2/1998 |
| JP | 10-032521 | 2/1998 |
| JP | 10-126281 | 5/1998 |

| | | |
|---|---|---|
| JP | 10-126307 | 5/1998 |
| JP | 10-303314 | 11/1998 |
| JP | 11-027168 | 1/1999 |
| JP | 11-027177 | 1/1999 |
| JP | 11-055156 | 2/1999 |
| JP | 11-206012 | 7/1999 |
| JP | 2000-134945 | 5/2000 |
| JP | 2000-156651 | 6/2000 |
| JP | 2000-196495 | 7/2000 |
| JP | 2000-196496 | 7/2000 |
| JP | 2000-228060 | 8/2000 |
| JP | 2000-236201 | 8/2000 |
| JP | 2000-278168 | 10/2000 |
| JP | 2001-044883 | 2/2001 |
| JP | 2001-044884 | 2/2001 |
| JP | 2001127663 | 5/2001 |
| JP | 2001-185902 | 7/2001 |
| JP | 2001-237372 | 8/2001 |
| JP | 2002-064401 | 2/2002 |
| JP | 2002-118487 | 4/2002 |
| JP | 2002-208873 | 7/2002 |
| SU | 502511 | 2/1976 |
| WO | WO98/47190 | 10/1998 |
| WO | WO 00/46931 | 8/2000 |
| WO | WO 00/57515 | 9/2000 |
| WO | WO02/058239 | 7/2002 |
| WO | WO03/030382 | 4/2003 |
| WO | WO03/030383 | 4/2003 |
| WO | WO03/030384 | 4/2003 |
| WO | WO03/030386 | 4/2003 |
| WO | WO2004/032350 | 4/2004 |

OTHER PUBLICATIONS

Machine Translation of Application No. JP2000-236201.
English Translation of Int'l Preliminary Examination Report for Application No. PCT/DE2002/00129, dated Feb. 6, 2003.
Int'l Search Report in Application No. PCT/DE03/03274, dated Apr. 2, 2004.
Examination Report in German Application No. DE10246098.1, dated Oct. 14, 2005.
Examination Report in German Application No. DE10201435.3, dated Sep. 1, 2008.
Examination Report in Japanese Application No. 2000-558612, dated Feb. 14, 2008.
Action and Response History for U.S. Appl. No. 10/490,753, through Feb. 5, 2009.
Action and Response History for U.S. Appl. No. 10/490,914, through Feb. 5, 2009.
Action and Response History for U.S. Appl. No. 10/526,278, through Feb. 5, 2009.
Action and Response History for U.S. Appl. No. 10/490,753, through Apr. 21, 2009.
Action and Response History for U.S. Appl. No. 10/526,278, through Apr. 21, 2009.
Benz et al., "Tabellenbuch Radio—und Fernsehtechnik Funkelektronik", XP002232831, Kieser-Verlag, Neusäss, p. 130, 135, 286 (1993).
Gramegna, G. et al., "A Sub-1-dB NF ±2.3-kV ESD-Protected 900-MHz CMOS LNA", *IEEE Journal of Solid-State Circuits*, 36(7):1010-1017 (2001).
Steyaert, M.S.J. et al., "Low-Voltage Low-Power CMOS-RF Transceiver Design", *IEEE Transactions on Microwave Theory and Techniques*, 50(1):281-287 (2002).
Lucero, et al "Design of an LTCC Switch Diplexer Front-End Module for GSM/DCS/PCS Applications", IEEE Radio Frequency Integrated Circuits Symposium, May 20-22, 200, pp. 213-216.
English Translation of Int'l Preliminary Examination Report for Application No. PCT/DE2002/003665, dated Sep. 2, 2003.
English Translation of Examination Report in corresponding Application No. JP62-098905, dated Apr. 5, 2007.
English Translation/Summary of German Examination Reports in Application No. 102 01 434, dated Feb. 3, 2003 and Sep. 8, 2006.
Machine Translation of JP 2001-127663 (Hayakawa), 23 pgs.
Machine Translation of JP09-284168 (Sawai Tetsuo), 13 pgs.
Machine Translation of JP2000-156651 (Katagishi Makoto), 10 pgs.
International Norm IEC 61000-4-2, Edition 1.2, Apr. 2001.
Action and Response History for U.S. Appl. No. 10/490,753, through Jul. 22, 2008.
Action and Response History for U.S. Appl. No. 10/490,914, through Jul. 22, 2008.
Action and Response History for U.S. Appl. No. 10/490,930, through Jul. 22, 2008.
Action and Response History for U.S. Appl. No. 10/490,711, through Jul. 22, 2008.
Examination Report from corresponding JP application.
Examination Report in counterpart Japanese Application No. 2003-533457, dated Jun. 19, 2008.
Machine Translation of JP05-299209.
Machine Translation of JP07-036548.
Machine Translation of JP09-284168.
Machine Translation of JP10-303314.
Machine Translation of JP2000-228060.
Machine Translation of JP2001-237372.
Pieters et al., "High-Q Integrated Spiral Inductors for High Performance Wireless Front-End Systems", in IEEE Radio and Wireless Conf., Denver, CO, (2000), pp. 251-254.
Action and Response History for U.S. Appl. No. 10/490,753, through Aug. 3, 2010.
Action and Response History for U.S. Appl. No. 10/526,278, through Aug. 3, 2010.
Action and Response History for U.S. Appl. No. 10/526,278, through Nov. 3, 2010.
Machine Translation of Japanese Publication No. 06-112850 (Pub. Date Apr. 1994).
Machine Translation of Japanese Publication No. 2000-278168 (Pub. Date Oct. 2000).
Machine Translation of Japanese Publication No. 06-077707 (Pub. Date Mar. 1994).
Machine Translation of Japanese Publication No. 11-027177 (Pub. Date Jan. 1999).
Machine Translation of Japanese Publication No. 10-126307 (Pub. Date May 1998).
Machine Translation of Japanese Publication No. 09-200077 (Pub. Date Jul. 1997).
Machine Translation of Japanese Publication No. 2000-196495 (Pub. Date Jul. 2000).
Machine Translation of Japanese Publication No. 2000-196496 (Pub. Date Jul. 2000).
Machine Translation of Japanese Publication No. 10-032521 (Pub. Date Feb. 1998).
Machine Translation of Japanese Publication No. 11-055156 (Pub. Date Feb. 1998).
Machine Translation of Japanese Publication No. 2001-185902 (Pub. Date Jul. 2001).
Machine Translation of Japanese Publication No. 2002-118487 (Pub. Date Apr. 2002).
Machine Translation of Japanese Publication No. 2002-208873 (Pub. Date Jul. 2002).
Machine Translation of Japanese Publication No. 2002-064401 (Pub. Date Feb. 2002).
Machine Translation of Japanese Publication No. 10-32521 (publication date: Feb. 3, 1998).

* cited by examiner

ELECTRIC CIRCUIT MODULE, CIRCUIT MODULE ARRANGEMENT AND USE OF SAID CIRCUIT MODULE AND OF SAID CIRCUIT MODULE ARRANGEMENT

TECHNICAL FIELD

This application relates to an electrical switching module with a switch which has a transmitter and receiver input and an output, and which electrically connects an input with the output, as desired, and with passive components which form a low-pass filter which is electrically connected to a transmitter input of the switch.

BACKGROUND

There are already switching modules of the input type described, in which the switch is composed of PIN diodes and is therefore current controlled. Here, low-pass filters are used, which are integrated into a LTCC multi-layer ceramic with 10 to 15 ceramic layers. These switching modules are used as multi-band front-end modules for mobile telephones and have a receiver and transmitter input for at least two different frequency bands in each case.

These kinds of conventional switching modules fulfill the following different functions:

Function 1: Connection of the frequency bands used to an antenna

Function 2: Selection of frequency band

Function 3: Selection between transmitting and receiving

Function 4: Filtering of the signals coming from a power amplifier

Function 5: Filtering of the signals received via the antenna

Functions 1 and 2 are performed by a diplexer that is composed of passive components and is integrated into the passive module. Function 3 is performed by selector switches that are created using PIN diodes. The filtering of the signals coming from the amplifiers is done by low-pass or band-pass filters; monolithic microwave ceramic, LC-filters, SAW (surface acoustic wave) and/or BAW (bulk acoustic wave) band-pass filters are used for Function 5.

The conventional switching modules have the disadvantage that the diode switches used need switching power of up to 10 mA, which because of the accumulator power required for this, primarily affects the maximum speaking time for the mobile phone.

The conventional switching module also has the disadvantage of a high insertion loss which adds up to higher losses (in some cases >1.0 dB) mainly as a result of the large number of passive components needed for the diplexer, such as coils and capacitors together with diodes forming the selector switch and together with the transmitter filters.

The conventional switching module has the further disadvantage that due to the different selection functions, firstly between transmitting and receiving and secondly between the frequency bands, a large number of passive components are integrated in the passive module, which leads to high losses and limits the extent to which the conventional module can be miniaturized.

In addition, the use of diodes entails the need for additional passive components such as voltage multipliers or capacitors.

In addition, conventional switching modules have the disadvantage that, due to the large number of passive components, the multi-layer ceramic passive module is very complex and accordingly requires more development time and is not very flexible in adjusting to altered specifications. The complexity of the passive module and its size are also increased by the transformation lines that are required for the PIN diode to work.

The conventional switching modules also have the disadvantage that integrating a large number of different frequency bands or a corresponding switchover function is not possible for reasons of space because of the fact that for each switchover function, two diodes are needed.

There are also already switching modules of the input type referred to at the beginning, in which a gallium arsenide switch is attached to a laminate. The low-pass filters are here attached to the laminate as discrete components next to the switch.

These switching modules have the disadvantage that they require a great deal of space and must therefore be configured externally on the mobile phone board.

SUMMARY

The application is directed to an electrical switching module which has a voltage-controlled switch, which includes a transmitter input and a receiver input and an output. The switch electrically connects one of the inputs with the output as desired. In addition, the electric switching module has passive components, which form a low-pass filter that is electrically connected to a transmitter input of the switch. Here, the passive components are part of a passive module which is designed as multi-layer ceramic. The passive module has a main casting of superimposed dielectric layers and electrically conductive layers. The switch of the switching module is configured on the upper side or on the lower side of the main casting.

The application also relates to a switching module configuration with the switching module, whereby every transmitter is electrically connected to a transmitter amplifier via a low-pass filter, and every receiver is electrically connected to a receiver amplifier via a band-pass filter. In addition, the output of the switching module is connected to an antenna. This kind of switching configuration can be used for instance in mobile phones, and this is why the advantageous use of the switching module and the switching module configuration as a front-end module in a mobile phone is another feature.

The switching module has the advantage that the switch is a voltage-controlled switch which is not switched on by current but by electrical voltage and thus uses extremely little power. Consequently there is no need for diodes which use a lot of current. In addition, there is no need for additional passive components such as capacitors or voltage multipliers that are necessary for diodes to operate. Thus, the switching module has the advantage of using little current and the advantage of not being very complex.

The aforementioned advantages apply both to the switching module and to the configuration of the switching module and/or use of the switching module.

It is also advantageous if the switch of the switching module has switching power of less than 10 μA. This results in a switching module that uses very little power.

In addition, it is advantageous if the switch of the switching module has a very small insertion loss <1 dB, thus enhancing the transmission or receiving capacity of a mobile phone using the switching module.

A further design advantage is a switching module containing a band-pass filter which is configured on the upper or lower side of the main casting. Here, the band-pass filter can also be configured in a suitable recess of the main casting. In addition, the band-pass filter is electrically connected to a receiver input. Filters like LC-, SAW-, BAW-, or microwave ones can be can be advantageous when used as band-pass filters.

Because the voltage-controlled switch needs less room than the conventional diodes used for switching, the switching module enables the band-pass filters necessary for receiving radio signals to be integrated with the voltage-controlled switch on one side of the main casting and thus allows a higher integration density to be achieved with the switching module, requiring less room overall. Using ceramic ferrimagnetics or ferrimagnetics enables the integration of higher inductance values and enables them to be miniaturized while at the same time achieving high ratings.

The switching module can in particular be designed as a multi-band front-end module with the switch having a number K>1 transmitter inputs and a number L>1 receiver inputs. The switch thereby electrically connects one of the inputs to its output as desired. The passive components of the electrical switching module form a number K of low-pass filters each of which is electrically connected to a transmitter input.

This type of switching module has the advantage that the switch also enables switch over between different frequency bands as well as having the function of switching between transmitting and receiving. In particular, by choosing appropriate numbers K and L (K=2, 3, 4 . . . and L=2, 3, 4 . . . ), a large number of different frequencies can also be processed using the switching module. It is therefore advantageous if every low-pass filter in the switching module is suitable for a different mobile phone standard, from either GSM, PCN, PCS or another mobile phone standard. The switching module can therefore be switched over between various transmitter inputs which can be allocated to different mobile phone frequencies, thus producing a multi-band module.

This type of switching module has the added advantage that there is no need for a diplexer, which is required for selecting between various frequency bands as per the state of technology described initially. This provides the advantage that fewer passive components are integrated in the passive module, so that development time is reduced and/or there is more flexibility in adjusting the switching module to altered specifications. For example, there may be less than ten passive components in the switching module.

The fact that there is a smaller number of passive components in the passive module has the additional advantage that the switching module is not as high and so takes up less room.

In particular this enables a switching module to be created the height of which is less than 1.8 mm, whereby this kind of switching module has the advantage that it corresponds to the standard dimensions of the companies that manufacture mobile phones.

The voltage-controlled switch in the switching module can be designed, particularly advantageously, by having it include an integrated circuit that is manufactured using GaAs technology. This type of integrated circuit can be manufactured, for instance, based on field effect transistors. A switch manufactured using gallium arsenide technology has several advantages: it is quick, has very little insertion loss and also has good high frequency properties.

In addition, a design advantage of the passive module is that it may have additional passive components that form at least one band-pass filter which is electrically connected to a receiver input. Instead of an extra band-pass filter configured on the upper or lower side of the main casting, in this case, the band-pass filter required for further processing of signals received by an antenna would already be integrated in the switching module in a very compact design, and so the space requirement would be even further reduced.

The switching module can be manufactured to particular advantage using LTCC (low temperature cofired ceramic) technology, i.e. overall sintering of ceramic sheets at relatively low sintering temperatures <1000° C. This kind of overall sintering of ceramic sheets at low sintering temperatures has the advantage that either copper electrodes (sintering with reduced oxygen content) or silver electrodes can be used as electrically conductive layers. Both materials have good HF properties. The overall sintering leads to rapid production of a compact monolithic component.

A gallium arsenide switch can be used as a voltage-controlled switch. These kinds of switches need a control input for each input or output. Each control input must accordingly be connected to a pilot wire. Here the control inputs are positioned through the pilot wires in such a way that exactly one control input is set to "high" and the other control inputs are set to "low." A precisely defined switching position is thereby set for the switch.

In order to reduce the number of pilot wires, it is advantageous if, in addition to the switch, a decoder is provided that converts the logical signals adjacent to its inputs to control signals that are suitable for controlling the voltage-controlled switch. The decoder has the advantage of being configured on the upper or lower side of the main casting. The control outputs of the decoder are connected via pilot wires to control inputs of the switch. The number of the control inputs of the decoder is reduced in contrast to the number of control inputs of the switch, whereby the number of the pilot wires to be attached from outside is reduced, resulting in another advantage. The signals adjacent to the inputs of the decoder correspond to a binary number, whereby several inputs can also be discharged when the switch status is "high." These input signals are converted by the decoder so that, at the decoder output, only one pilot wire precisely has the "high" signal.

A further design advantage is that the switching module includes an amplifier, the passive components of which are integrated into the passive module and the active components of which are configured on the upper or lower side of the main casting. A power amplifier or even a low noise amplifier (LNA) can be considered, for instance.

The LNA is needed, for example, if band-pass filters are integrated in the passive module. In this case, the LNA is switched according to the band-pass filter. The amplifiers named provide additional functions for the switching module, which is why it is advantageous to integrate them in the switching module.

It is also advantageous if the low-pass filter that is integrated in the passive module is a higher order filter. This kind of filter can be obtained, for example, by expanding a filter, which which consists of two capacitors that are connected to each other by inductivity. The expansion of the $\pi$-filter can be done by bypassing the inductivity by an additional capacitor. This provides one with additional poles for the filter, whereby the filter is particularly suited for absorbing higher harmonics of a basic frequency f0. When operating a gallium arsenide switch with low voltages, such higher harmonics of a basic frequency f0 arise; hence, it is advantageous to use a higher order low-pass filter in the switching module described in this application in order to suppress these interfering higher harmonics.

DETAILED DESCRIPTION

Figure 1:
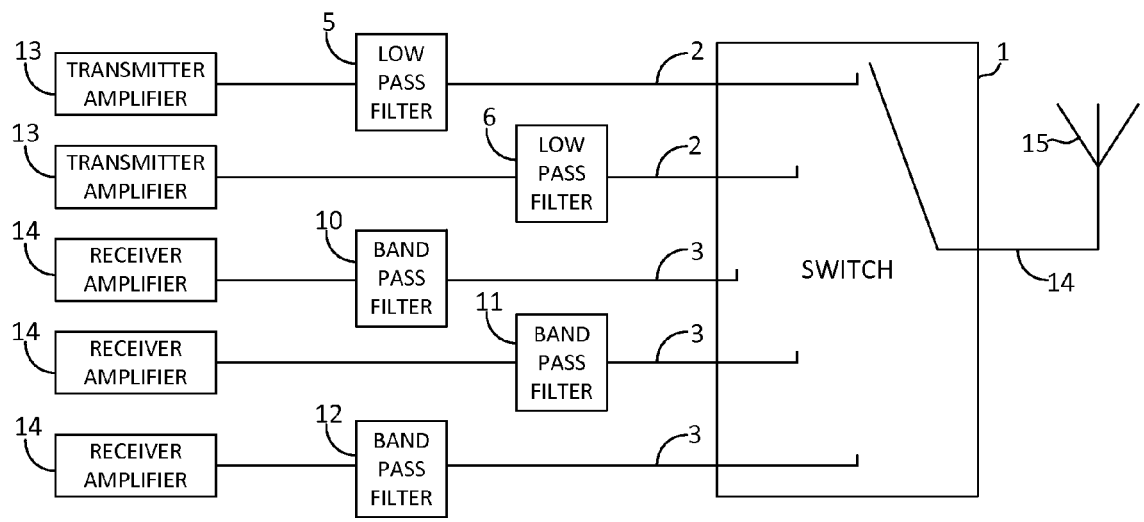
FIG. 1 shows an example of a block diagram of a switching module.

FIG. 1 shows a switching module with a switch 1 which has an output 4 and two transmitter inputs 2 and three receiver inputs 3. In addition, the switching module has two low-pass filters 5, 6, whereby the low-pass filter 5 can be configured for the GSM frequency and the low-pass filter 6 for the PCN/PCS frequency band. The switch 1 connects, as desired, one of the inputs 2, 3 with its output 4. The switching module also has band-pass filters 10, 11, 12, which are connected to the receiver inputs 3. The band-pass filter 10 is tuned to the GSM-frequency, the band-pass filter 11 is tuned to the PCN frequency, and the band-pass filter 12 is tuned to the PCS frequency. The band-pass filters 10, 11, 12 can be configured either as separate components on the upper or lower side of the main casting or can also be constructed from passive components integrated in the passive module.

As regards the switching module configuration, the transmitter inputs 2 of the switch 1 are electrically connected to transmitter amplifiers 13. The transmitter amplifiers 13 are tuned like the low-pass filters 5, 6 to the GSM or PCN/PCS radio frequencies, as the case may be. The receiver inputs 3 are electrically connected via the band-pass filters 10, 11, 12 to receiver amplifiers 14, whereby the receiver amplifiers 14 are tuned to the GSM or PCN/PCS radio frequencies, as the case may be. The output 4 of the switch 1 is connected to an antenna 15. The signals received by the antenna 15 can now be sent by means of the switch 1 either to band-pass filter 11, band-pass filter 12 or band-pass filter 10, where they are filtered according to the radio frequency used and further processed in amplifiers 14. The signals sent by the transmitter amplifiers 13 are filtered through the low-pass filters 5, 6 and sent as desired to the antenna 15 for sending a signal.

Figure 2:
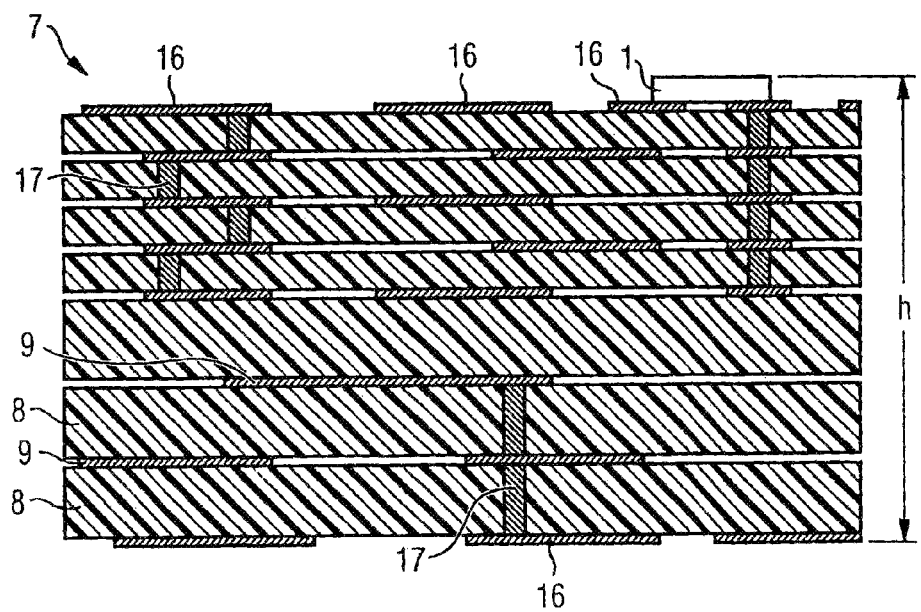
FIG. 2 shows an example of an electric switching module in outline cross-section.

FIG. 2 shows a switching module with a main casting 7, which includes a multi-layer ceramic with dielelectric layers 8 and electrically conductive layers 9 in between. The height (h) may be less than 1.8 mm.

The dielectric layers 8 are ceramic layers that have, for instance, a dielelectric function for a capacitor. For example, an Al2O3 ceramic with glass content can be used as ceramic. This kind of ceramic typically has an effective $\in$ of 7.8 with low losses.

In addition to the dielectric layers, the switching module can also have resistor layers which are manufactured by applying a resistor paste onto an electrically conductive layer 9.

In addition to the electrically conductive layers 9 which are configured between the dielectric layers 8, the main casting 7 also includes through connections 17, which electrically connect the electrically conductive layers 9 of different levels with each other. The electrically conductive layers 9 can, for example, be designed as copper layers. On the underside of the main casting 7, external contacts 16 are configured so that the switching module can be soldered on a board and contacted. External contacts 16 are also located on the upper side of the main casting 7, so that the current-controlled switch 1 and, if necessary, other passive filter components can be fixed and contacted.

The switch 1 can for example be fixed and electrically contacted by sticking and additional wire bonding. A GaAs gang switch may be used as a switch 1, as supplied by the company Alpha Industries Inc. under the designation PHEMT GaAs IC High Power SP5T Switch 0.1-2 GHz. This kind of switch has an insertion loss of 0.8 dB in the frequency range 0.1-0.5 GHz. This is an integrated gallium arsenide-based circuit with FET, the pin surfaces of which can be connected to the main casting 7 by soldering.

Figure 3:
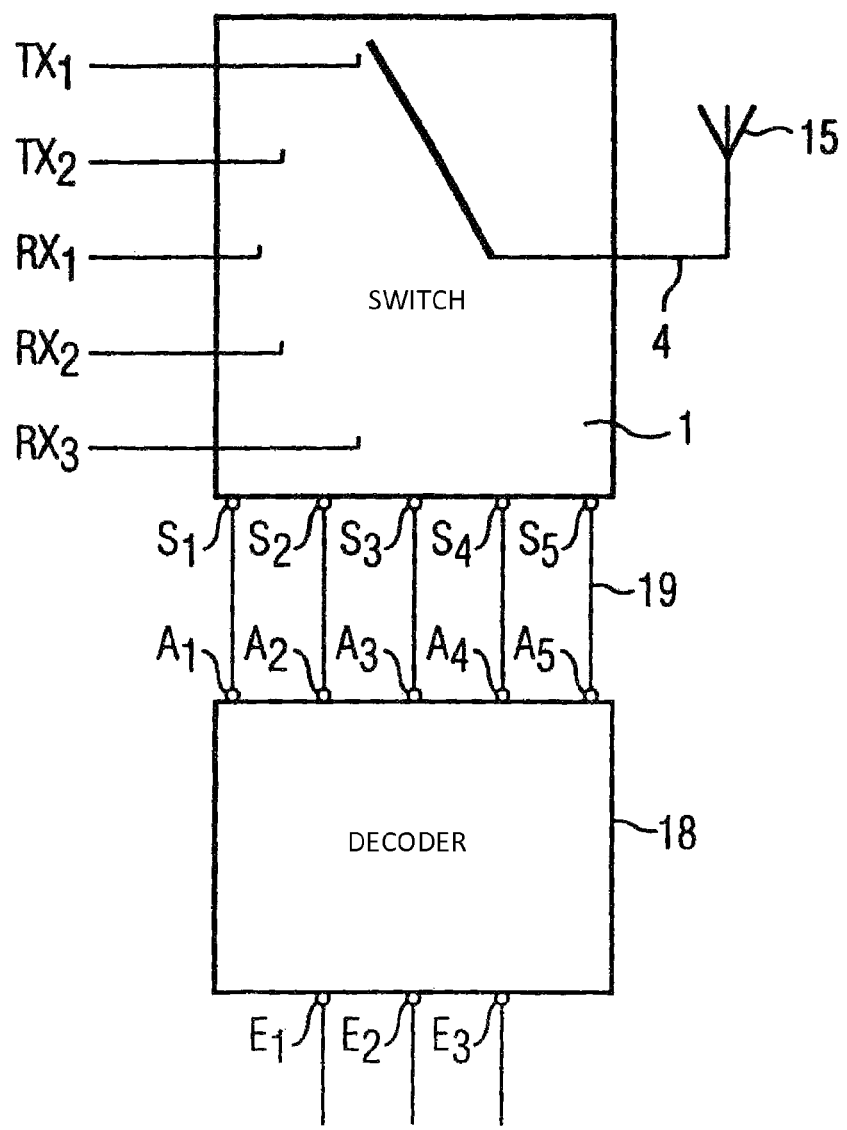
FIG. 3 shows an example of a block diagram of a switching module and a decoder.

FIG. 3 shows a voltage-controlled switch 1 with an output 4, to which an antenna 15 is attached. The switch 1 has transmitter inputs TX1, TX2 and receiver inputs RX1, RX2 and RX3. The switch 1 is controlled via control inputs S1, S2, S3, S4, S5. Controlling is done so that exactly one of the control inputs S1, S2, S3, S4, S5 is set to "high" and the other control inputs are set to "low." The decoder 18 attached to the switch 1 serves to reduce the number of inputs required. The decoder 18 can, for instance, be a 1- out of 5-decoder. It has control inputs E1, E2, E3 and control outputs A1, A2, A3, A4, A5. The control outputs A1, A2, A3, A4, A5 are connected by pilot wires 19 to the control inputs S1, S2, S3, S4, S5 of the switch 1.

Decoding a logical signal adjacent to the inputs E1, E2, E3 of the decoder 18 into signals adjacent to the control inputs S1, S2, S3, S4, S5 of the switch 1 that are suitable for controlling the switch 1 is described in the following conversion table:

TABLE 1

Logical conditions of the control inputs S1, S2, S3, S4, S5 dependent upon the logical conditions at the control inputs E1, E2, E3. 1 = high and 0 = low.

| E1 | E2 | E3 | → | S1 | S2 | S3 | S4 | S5 |
|---|---|---|---|---|---|---|---|---|
| 0 | 0 | 0 |   | 1 | 0 | 0 | 0 | 0 |
| 0 | 0 | 1 |   | 0 | 1 | 0 | 0 | 0 |
| 0 | 1 | 0 |   | 0 | 0 | 1 | 0 | 0 |
| 0 | 1 | 1 |   | 0 | 0 | 0 | 1 | 0 |
| 1 | 0 | 0 |   | 0 | 0 | 0 | 0 | 1 |

The invention is not limited to the examples described herein.

What is claimed is:

1. Circuitry comprising:
   a voltage-controlled switch having transmitter inputs, receiver inputs, and an output, the voltage-controlled switch for electrically connecting the output to a single fixed transmission path containing only one transmitter input or one receiver input; and
   passive components forming low-pass filters that are electrically connected to the transmitter inputs, the passive components being part of a ceramic passive module that includes a base body comprised of dielectric layers and electrically conductive layers among the dielectric layers;
   wherein an entirety of the voltage-controlled switch is on an upper portion or a lower portion of the base body; and
   wherein:
   the voltage-controlled switch comprises K (K>1) transmitter inputs and L (L>1) receiver inputs, and has K+L switching states; and
   the passive components form K low-pass filters, each low-pass filter being electrically connected to one transmitter input.

2. The circuitry of claim 1, wherein the voltage-controlled switch responds to a switching current of <10 µA.

3. The circuitry of claim 1, wherein the voltage-controlled switch has an insertion loss of <1 dB.

4. The circuitry of claim 1, further comprising a band-pass filter that is on the upper portion or the lower portion of the base body and that is electrically connected to a receiver input.

5. The circuitry of claim 1, wherein the ceramic passive module includes less than ten passive components.

6. The circuitry of claim 1, wherein the switch comprises an integrated circuit that is produced using GaAs-technology.

7. The circuitry of claim 1 having a height of less than 1.8 mm.

8. The circuitry of claim 1, wherein each low-pass filter is for use with a mobile wireless standard comprising at least one of GSM, PCN, and PCS.

9. The circuitry of claim 1, further comprising additional passive components integrated into the ceramic passive module, the additional passive components forming at least one band-pass filter that is electrically connected to one of the receiver inputs.

10. The circuitry of claim 1, wherein the circuitry is produced using LTCC-technology.

11. The circuitry of claim 1, further comprising a decoder on the upper or lower portion of the base body, the decoder having control outputs and control inputs, the control outputs being electrically connected to inputs of the voltage-controlled switch via control lines.

12. The circuitry of claim 1, further comprising an amplifier having passive components that are integrated into the ceramic passive module and having active components on the upper or lower portion of the base body.

13. The circuitry of claim 1, wherein at least one low-pass filter comprises a higher-order filter.

14. A circuit module array comprising the circuitry of claim 1, wherein:
   each transmitter input is electrically connected to a transmitter amplifier through a low-pass filter;
   each receiver input is electrically connected to a receiver amplifier through a band-pass filter; and
   the output is electrically connected to an antenna.

15. A front-end module of a mobile wireless device, the front end module comprising the circuitry of claim 1.

16. A front end module of a mobile wireless device, the front end module comprising the circuitry of claim 14.

17. An electrical switching module comprising:
   a voltage-controlled switch having K (K>1) transmitter inputs, L (L>1) receiver inputs, and an output, the voltage-controlled switch having K+L switching states and being configured to electrically connect the output to a single fixed transmission path containing only one transmitter input or only one receiver input, the output being electrically connected to an antenna; and
   low-pass filters, each of the low-pass filters being electrically connected to one of the transmitter inputs, each low-pass filter comprising passive components that are part of a passive module having a base comprised of dielectric layers and electrically conductive layers among the dielectric layers, an entirety of the voltage-controlled switch being disposed at a top or bottom of the base.

18. The switching module of claim 17, further comprising a band-pass filter that is electrically connected to a receiver input.

19. The switching module of claim 18, further comprising:
   a transmitter amplifier connected to one of the low-pass filters; and
   a receiver amplifier connected to the band-pass filter.

* * * * *